(12) United States Patent
Ben Dayan et al.

(10) Patent No.: US 11,977,786 B2
(45) Date of Patent: May 7, 2024

(54) IMPLEMENTING COHERENCY AND PAGE CACHE SUPPORT IN A DISTRIBUTED WAY FOR FILES

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL); Artemy Voikhansky, Tel Aviv (IL); Alex Goltman, Tel Aviv (IL)

(73) Assignee: Weka.IO Ltd. (IL)

( * ) Notice: Subject to any disclaimer, the term of this patent is extended or adjusted under 35 U.S.C. 154(b) by 131 days.

(21) Appl. No.: 17/206,819

(22) Filed: Mar. 19, 2021

(65) Prior Publication Data

US 2021/0208786 A1  Jul. 8, 2021

Related U.S. Application Data

(63) Continuation of application No. 16/274,420, filed on Feb. 13, 2019, now Pat. No. 10,976,966.

(60) Provisional application No. 62/691,667, filed on Jun. 29, 2018.

(51) Int. Cl.
  *G06F 3/06*      (2006.01)
  *G06F 12/0871*   (2016.01)
  *G06F 12/14*     (2006.01)

(52) U.S. Cl.
  CPC ............ *G06F 3/067* (2013.01); *G06F 3/0604* (2013.01); *G06F 3/0631* (2013.01); *G06F 3/0685* (2013.01); *G06F 12/0871* (2013.01); *G06F 12/14* (2013.01)

(58) Field of Classification Search
  CPC ...... G06F 3/067; G06F 3/0631; G06F 3/0685; G06F 12/0871; G06F 12/14; G06F 3/0604
  See application file for complete search history.

(56) References Cited

U.S. PATENT DOCUMENTS

| | | |
|---|---|---|
| 6,487,636 B1 | 11/2002 | Dolphin et al. |
| 7,447,839 B2 | 11/2008 | Uppala |
| 7,681,072 B1 | 3/2010 | Gibson et al. |
| 7,793,146 B1 | 9/2010 | Gibson et al. |
| 8,645,749 B2 | 2/2014 | Reche |
| 8,918,478 B2 | 12/2014 | Ozzie et al. |
| 9,087,012 B1 | 7/2015 | Hayes et al. |
| 9,448,887 B1 | 9/2016 | Ben Dayan et al. |
| 9,792,305 B1 | 10/2017 | Bhamidipati |
| 2002/0112178 A1* | 8/2002 | Scherr ............... G06F 21/80 726/4 |

(Continued)

OTHER PUBLICATIONS

Int'l Search Report and Written Opinion Appln No. PCT/IB2019/001177 dated May 7, 2020.

(Continued)

*Primary Examiner* — Jae U Yu
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. The computing devices may use local caches in a coherent manner when accessing the plurality of storage devices.

20 Claims, 8 Drawing Sheets

(56) References Cited

U.S. PATENT DOCUMENTS

| | | | |
|---|---|---|---|
| 2003/0163649 A1* | 8/2003 | Kapur | G06F 12/0862 |
| | | | 711/146 |
| 2004/0186861 A1 | 9/2004 | Phatak | |
| 2010/0169392 A1 | 7/2010 | Lev Ran et al. | |
| 2010/0199125 A1 | 8/2010 | Reche | |
| 2012/0143999 A1 | 6/2012 | George et al. | |
| 2013/0160145 A1 | 6/2013 | Henzie et al. | |
| 2015/0242125 A1* | 8/2015 | Benhase | G06F 3/067 |
| | | | 711/114 |
| 2015/0355971 A1 | 12/2015 | Becker-Szendy et al. | |
| 2016/0246677 A1 | 8/2016 | Sangamkar et al. | |

OTHER PUBLICATIONS

Int'l Search Report and Written Opinion Appln No. PCT/IB2016/001177 dated Dec. 2, 2016.
Int'l Preliminary Report on Patentability Appln No. PCT/IB2019/000721 dated Jan. 7, 2021.
European Office Communication with extended Search Report Appln No. 19826657.9 dated Mar. 1, 2022.
Bowers K. et al: "Self-adaptive leasing for jinni", PERCOM '03 Proceedings of the First IEEE International Conference on Pervasive Computing and Communications, IEEE, US, Mar. 26, 2003 (Mar. 26, 2003), pp. 539-542, XP032384637, DOI: 10.1109/PERCOM. 2003.1192786 ISBN: 978-0-7695-1893-0.

* cited by examiner

IMPLEMENTING COHERENCY AND PAGE CACHE SUPPORT IN A DISTRIBUTED WAY FOR FILES

PRIORITY CLAIM

This application claims is a continuation of U.S. patent application Ser. No. 16/274,420 filed Feb. 13, 2019, which claims priority to the following application, which is hereby incorporated herein by reference:
U.S. provisional patent application 62/691,667 titled "IMPLEMENTING COHERENCY AND PAGE CACHE SUPPORT IN A DISTRIBUTED WAY FOR FILES" filed on Jun. 29, 2018.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for implementing coherency and page cache support in a distributed way for files in a distributed storage system substantially as illustrated by and/or described in connection with at least one of the figures, as set forth more completely in the claims.

DETAILED DESCRIPTION

Traditionally, filesystems use a centralized control over the metadata structure (e.g., directories, files, attributes, file contents). If a local filesystem is accessible from a single server and that server fails, the filesystem's data may be lost if as there is no further protection. To add protection, some filesystems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory such as, for example, RAM, for fast access, and may be backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
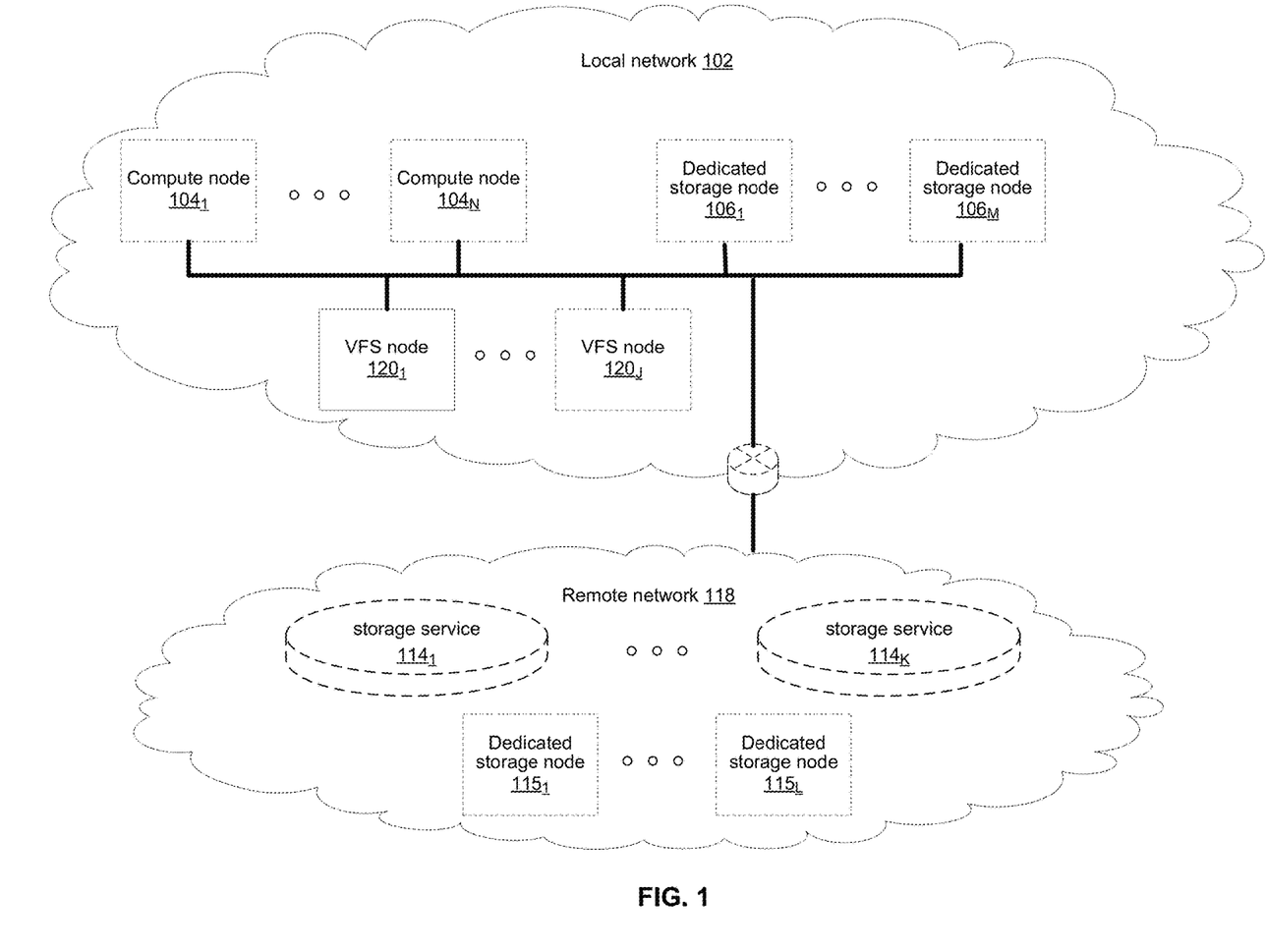
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each VFS node $120_j$ (j an integer, where $1 \leq j \leq J$) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
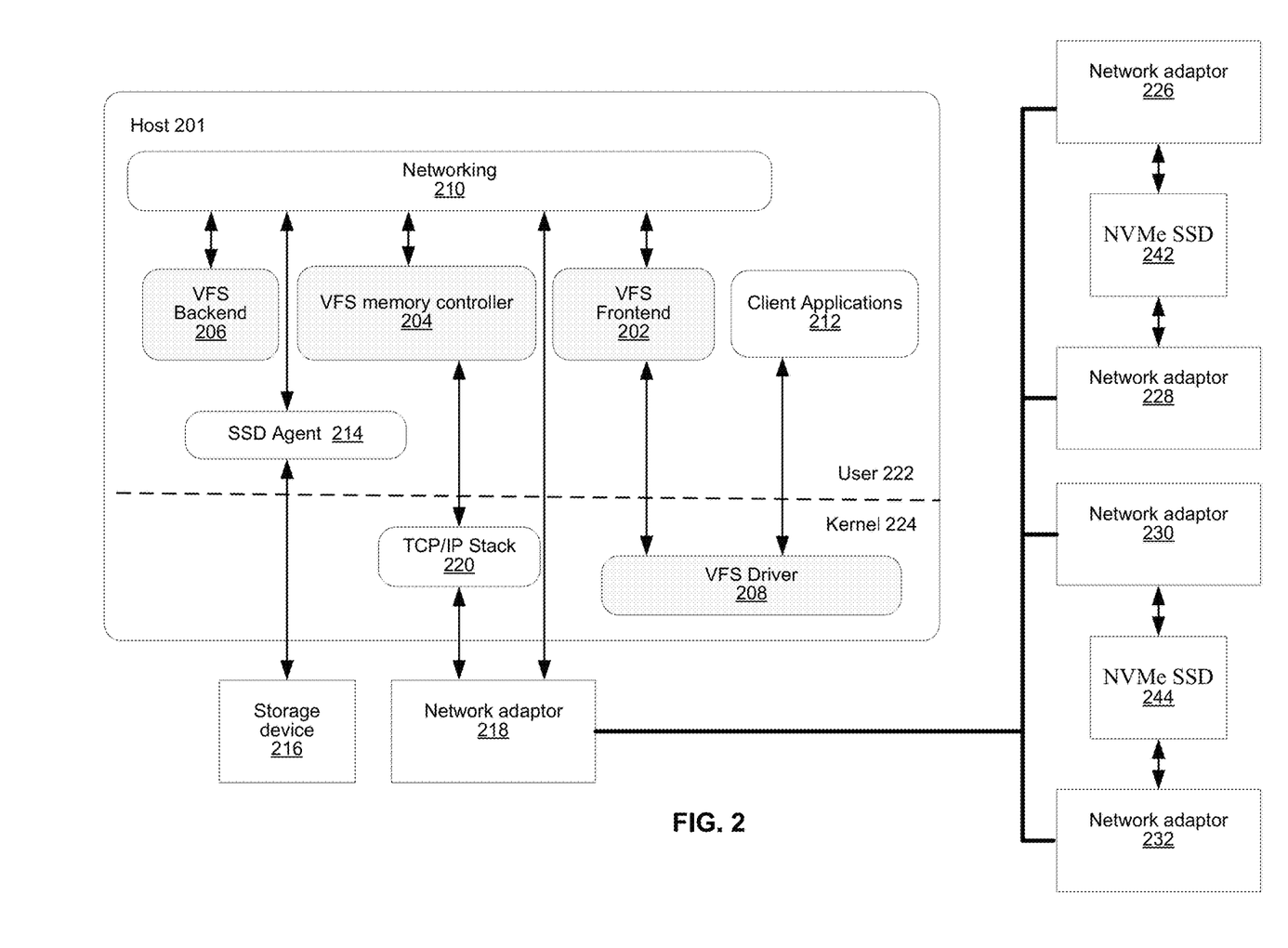
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage device 216 attached via a PCI Express (PCIe) bus. The non-volatile storage device 216 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD, for example, the non-volatile storage device 216, with the SSD agent 214 and networking 210. Alternatively, the SSD may be implemented as a network-attached NVMe SSD 242 or 244 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 242 and 244 to transform them into networked NVMe-oF devices without the use of a server. The NVMe SSDs 242 and 244 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective non-volatile storage device 216. This may include, for example, translating addresses, and generating the commands that are issued to the storage device (e.g., on a SATA, SAS, PCIe, or other suitable bus). Thus, the VFS SSD agent 214 operates as an intermediary between a non-volatile storage device 216 and the VFS backend 206 of the virtual file system. The SSD agent 214 could also communicate with a standard network storage device supporting a standard protocol such as NVMe-oF (NVMe over Fabrics).

Figure 3:
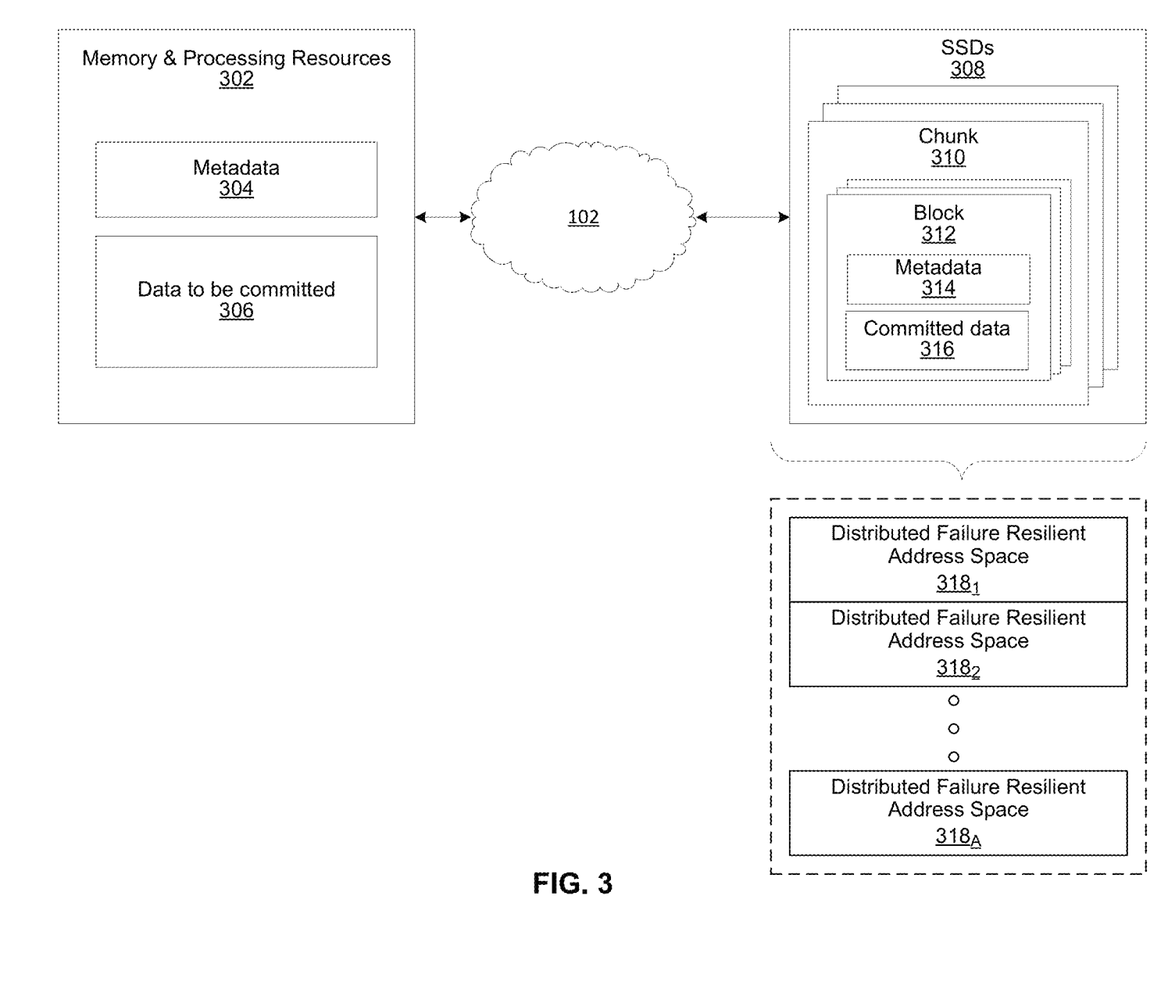
FIG. 3 illustrates another representation of a virtual file system in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical non-volatile storage devices 216 which provide the long term storage of the virtual file system.

As shown in FIG. 3, the physical storage is organized into a plurality of distributed failure resilient address spaces (DFRASs) 318. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30k servers could chop the metadata space into 128k or 256k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000

$$\left(\frac{26!}{5! * (26-5)!}\right)$$

possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Because each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 318) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes, and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

On a local filesystem, the default method of opening a file and writing to it puts the data in the write cache, so the write systemically returns immediately, and the following close operation to the file also returns immediately while the file update happens in the background. Some storage specification, such as, for example, the NFS (network file server) specification, states that upon close of a file all the dirty cache pages must be written, which may make the process inherently inefficient as the process has to wait after each write.

While a shared file system as disclosed herein may perform very well compared to other shared storages such as, for example, the NFS compliant storage systems, it can still be slower than a local file system. This may be because a local file system has the ability to perform many operations using RAM (random access memory), where a RAM operation can be, for example, hundreds of times faster than doing those equivalent operations over the network. For example, while 4k reads/writes could be performed in 150 microseconds on a coherent storage, which is considered to be very fast, reading or writing to RAM can measured in nanoseconds rather than microseconds.

Accordingly, optimizations to allow caching in local RAM of the computer may allow faster and more operations locally with no need to access the actual storage system. Depending on a configuration, a "local" RAM may be directly accessible to a computer, or accessed via a local network where the access times to the RAM can be controlled by configuring the local network to acceptable performance. Various embodiments may allow this to happen and still present sharable coherent storage to the end user by implementing, for example, "leases" for files.

A file lease may be, for example, a shared token between a backend, such as, for example, the VFS backend (BE) 206, and a frontend, such as, for example, a VFS frontend (FE) 202. The shared token may signal, for example, that a certain FE is using a certain file. In various embodiments, a lease may be given for an entire file, while other embodiments may give a lease for a portion of a file.

A lease holder may be an FE in a cluster that holds a lease for all the file users that are accessing the system through it. A cluster usage pattern may describe the properties of the group of lease holders, for example, FEs, that own a lease for a given file.

A read cache may not ever be dirty since only data that is saved to the BE appears in the read cache. However, a write cache may be said to be a dirty cache if it has data that wasn't saved by the BE.

A lease may have associated with it a lease capability that may describe what the lease holder, for example, a FE, can do with the file associated with the lease. For example, the lease capability may give read and/or write permission to the file. There may also be a capability that limits each FE to a certain range of the file. This may be useful, for example, when multiple FEs have leases to the same file. The lease may also denote cache capability. For example, a lease may not allow any caching, or a combination of read and/or write caching.

Accordingly, there may be, for example, two different types of operations. A first type of operation may be an operation that only performs a read operation using, for example, a read cache, and a second type of operation may be an operation that also allows generation of dirty data that is local to the server that only uses, for example, a write cache.

There may also be, for example, two different types of data to be cached where various types of caching mechanisms may be used. File data may be in read cache, for example, after being read from RAM, and a second read may return the same cached data if the system is sure no data changes happened to the data in the RAM. This may occur, for example, when there was no other FE that opened the file and actually wrote to the file.

For a write cache, the writes may be to the local RAM that may be acknowledged immediately, and which may then be written to the storage system. An immediate write to the storage system may be used when there is a write as in, for example, write-through caching, or a delayed write to the storage system may be used as in, for example, write-back caching. If two servers open the same data for write, then no read cache nor write cache may be enabled.

Figure 4:
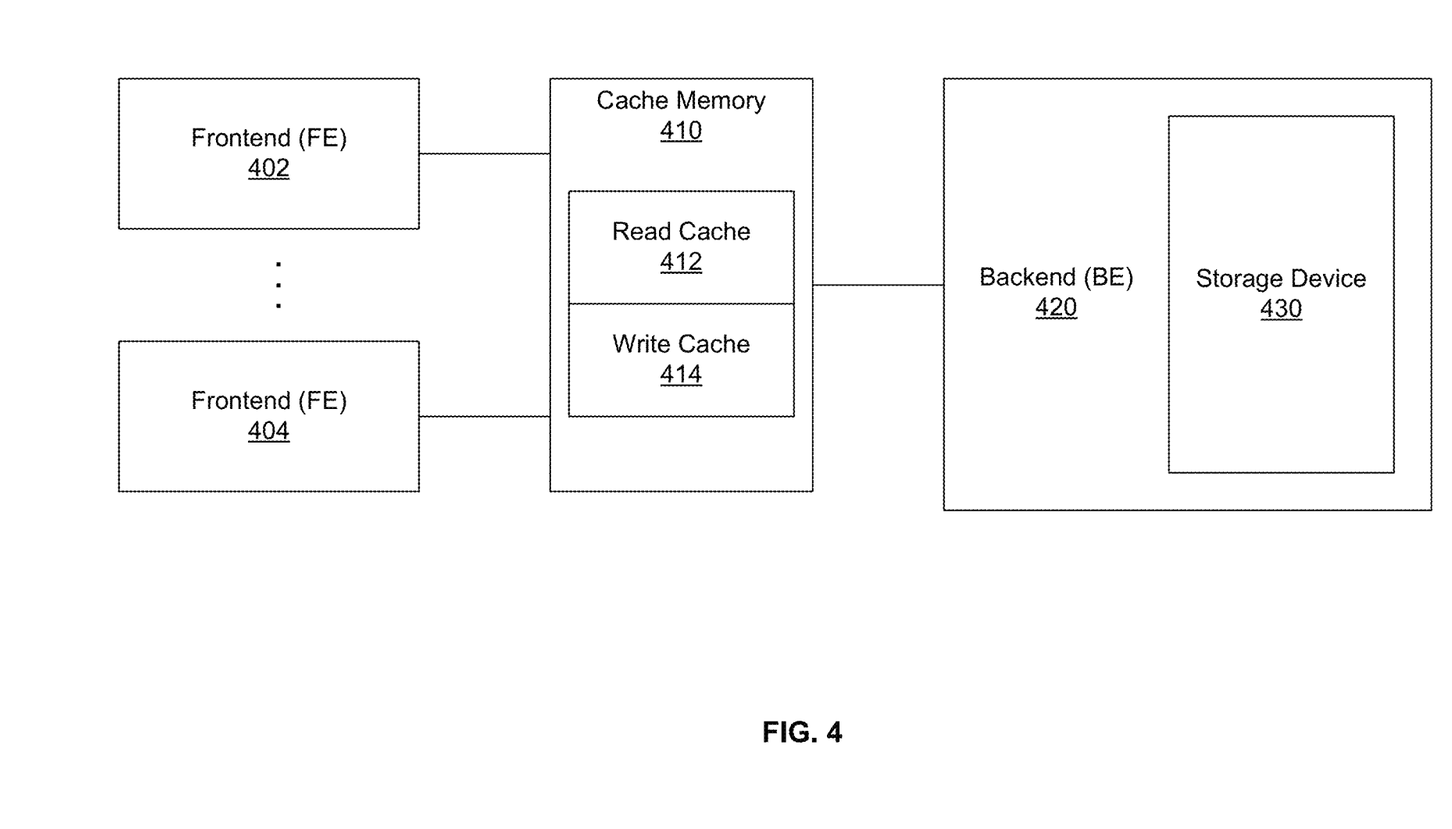
FIG. 4 illustrates a high level block diagram of an example configuration with cache memory in accordance with an example implementation of this disclosure.

FIG. 4 illustrates a high level block diagram of an example configuration with cache memory in accordance with an example implementation of this disclosure. Referring to FIG. 4, there are shown frontends (FE) 402, 404, cache memory 410, and a backend (BE) 420. The cache memory 410 may be, for example, RAM (random access memory) such as SRAM (static RAM) or DRAM (dynamic RAM), or another type of memory that has acceptable read and write times. The specific type of memory used may depend on, for example, access speed needed, cost constraints, etc.

The cache memory 410 may comprise a read cache 412 and a write cache 414. The BE 420 may have associated with it a storage device 430 that may be similar to the storage device 216 or the NVMe SSD 242, 244.

The FEs 402 and 404 may be similar to, for example, the VFS Frontend 202, and the BE 420 may be similar to, for example, the VFS Backend 206. The read cache 412 and the write cache 414 may be local to, for example, both of the FEs 402, 404, or each of the FEs 402 and 404 may have their respective local read cache 412 and local write cache 414. The storage device 430 may be locally attached to, for example, the BE 420 as the storage device 216 is locally attached to the SSD agent 214, or network attached to the FEs 402, 404 and the BE 420 as the NVMe SSD 242, 244 is network attached to the VFS Frontend 202 and the VFS Backend 206.

Prior to performing a memory access to the storage device 430, the FEs 402 and 404 may acquire a lease from the BE 420. FIGS. 5-7B show in more detail the various processes involved with a lease.

Figure 5:
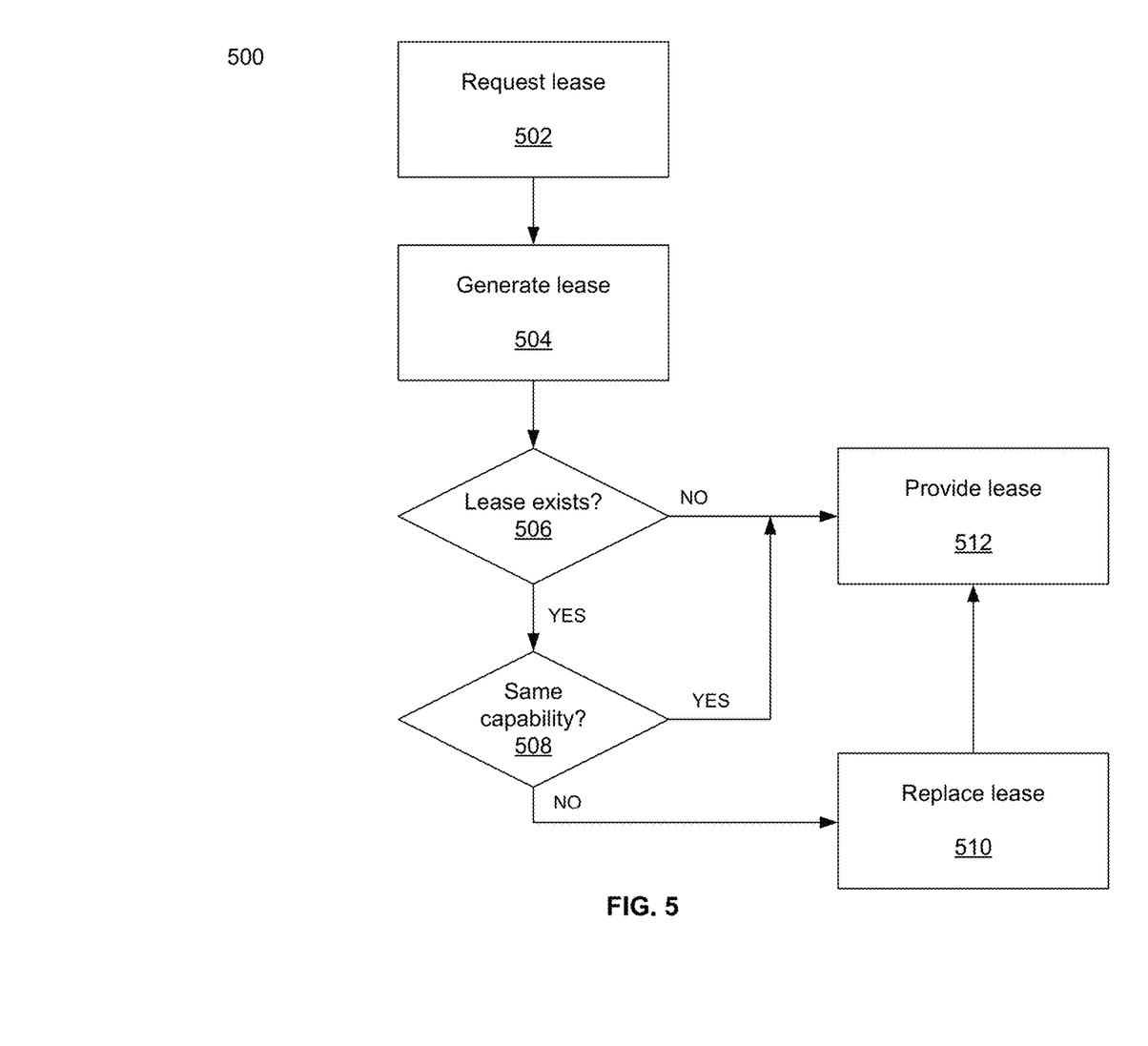
FIG. 5 illustrates an example flow diagram of lease acquisition in accordance with an example implementation of this disclosure.

FIG. 5 illustrates an example flow diagram of lease acquisition in accordance with an example implementation of this disclosure. Referring to FIG. 5, there is shown a flow diagram 500 with blocks 502 to 512.

When acquiring a lease, at block 502 a FE 402 may ask the BE 420 for a lease that has certain lease capabilities. At block 504, the BE 420 may then generate a new lease. At block 506, the BE 420 may check to see if the FE 402 has a lease in place. If the FE 402 does not have a lease, then at block 512 the generated lease may be provided to the FE 402. If the FE 402 already has a lease, then at block 508 the BE 420 may check whether the existing lease has the same capability as the generated lease. If so, the generated lease will be provided to the FE 402 at block 512. If not, then at block 510 the existing lease may be replaced with the generated lease, and the generated lease will be provided to the FE 402.

If the cluster usage pattern has changed as a result of granting the new lease, then the BE may revoke all previous leases on the file and grant new ones that reflect the change. Accordingly, a BE may allow the FE to access memory according to the FE's lease. However, if a FE's lease is invalid or has been revoked by the BE, then the FE may not be able to access memory.

Figure 6:
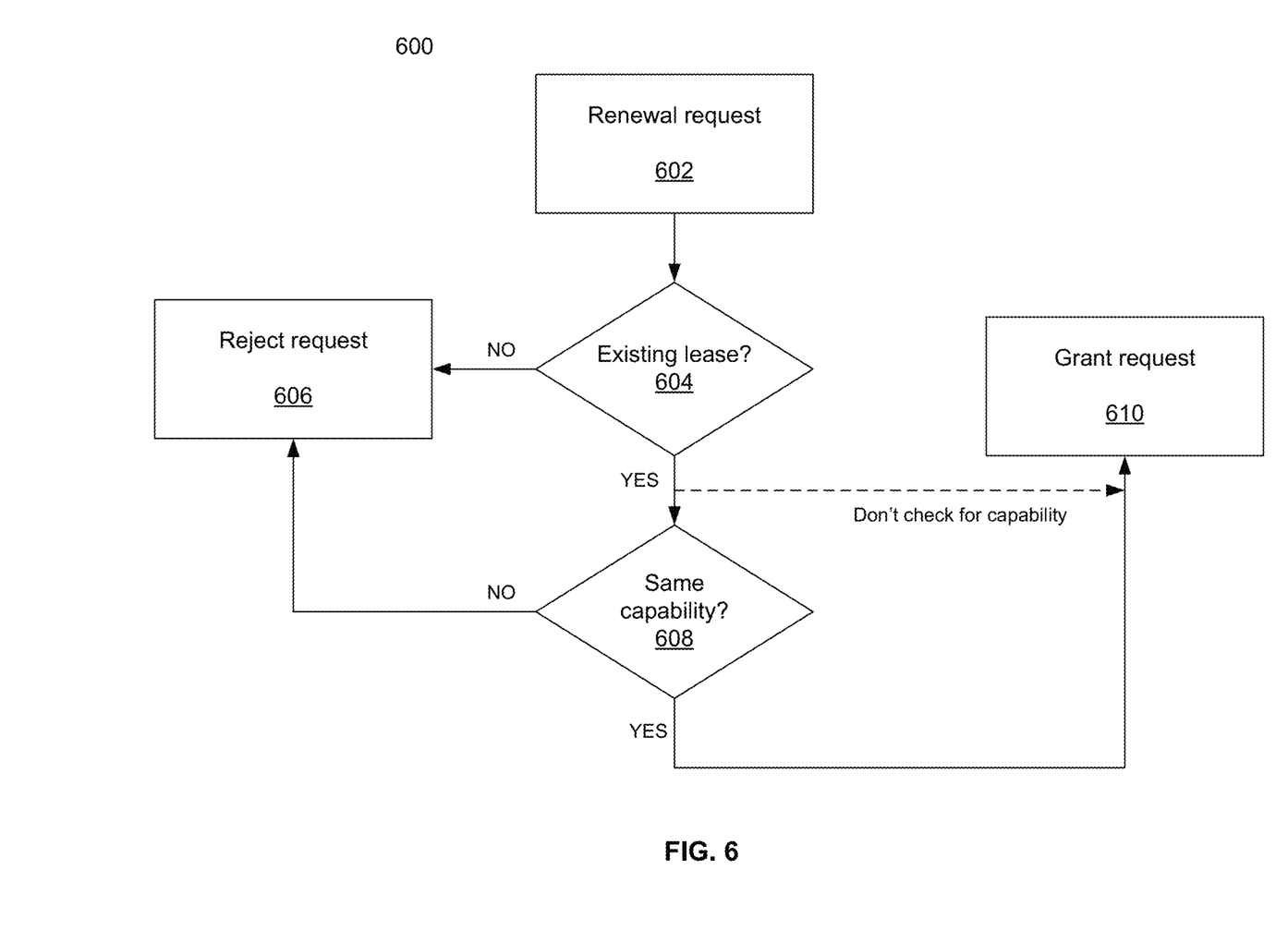
FIG. 6 illustrates an example flow diagram of lease renewal in accordance with an example implementation of this disclosure.

FIG. 6 illustrates an example flow diagram of lease renewal in accordance with an example implementation of this disclosure. Referring to FIG. 6, there is shown a flow diagram 600 with blocks 602 to 610. At block 602, a FE 402 may make a lease renewal request to the BE 420. This may happen, for example, if a lease is granted for a certain period of time. At block 604, the BE 420 may check to see if the FE 402 has a registered lease in the BE 420. If there is no existing lease, then at block 606 the BE 420 may reject the renewal request.

In certain embodiments, the BE 420 check to see if the renewal request has the same lease capability as the existing lease. If the capabilities are different, then the renewal request may be rejected at 606. If the capabilities are the same, then the renewal request may be granted at block 610.

In certain embodiments, the BE 420 may not check to see if the renewal request has the same lease capability as the existing lease. In that case, if there is an existing lease at block 604, the lease renewal request may be granted at block 610.

In granting a renewal request, the BE 420 may generate a new lease that has the same lease capability as the previous lease or different capability as the previous lease. Accordingly, the renewed lease may be thought of as a newly acquired lease.

Figure 7A:
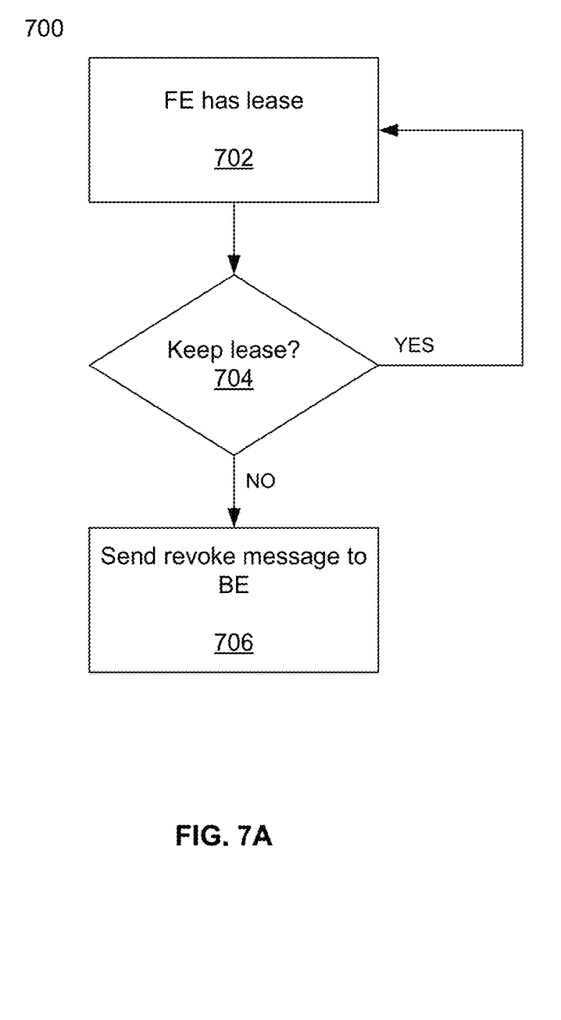
FIG. 7A illustrates an example flow diagram of revoking a lease in accordance with an example implementation of this disclosure.

FIG. 7A illustrates an example flow diagram of revoking a lease in accordance with an example implementation of this disclosure. Referring to FIG. 7A, there is shown a flow diagram 700 with blocks 702 to 706. At block 702, a FE 402 has a lease with which it is allowed to access cache memory 410. At block 704, the FE 402 may determine whether it needs the lease. The determination may depend on, for example, whether any user (e.g., application) remains on the FE 402. If there is no user remaining, then the FE 402 may not need access to the cache memory 410. Accordingly, in cases where the FE 402 no longer needs a lease, the FE 402 may relinquish the lease by notifying the BE 420 at block 706. The FE 402 and the BE 420 may then scrub the lease such that the FE 402 does not try to use the lease, and the BE 420 does not allow the lease to be used by that FE 402.

In some implementations, a BE 420 may revoke a lease from the FE 402 after elapse of a certain period of time and/or if the FE 402 has not accessed the corresponding file in a certain amount of time. The BE 420 may also revoke a lease if the FE 402 is fenced/removed from the cluster. The revocation may be performed by sending a revoke message to the FE 402. A node may be fenced if it is held out of service for some reason. The BE 420 may inform the FE 402 of the revocation.

Figure 7B:
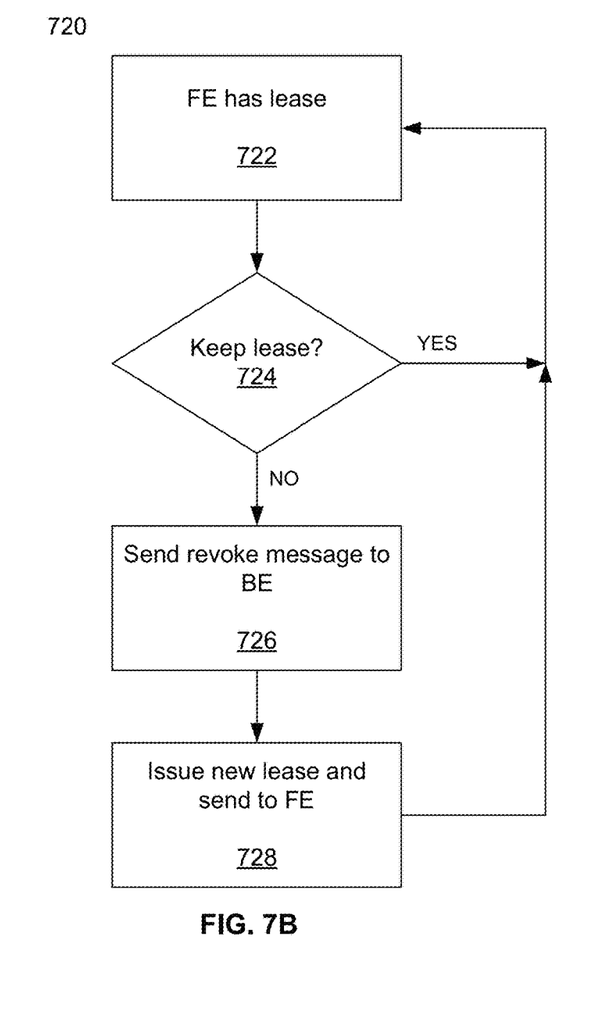
FIG. 7B illustrates another example flow diagram of revoking a lease in accordance with an example implementation of this disclosure.

FIG. 7B illustrates an example flow diagram of revoking a lease in accordance with an example implementation of this disclosure. Referring to FIG. 7B, there is shown a flow diagram 720 with blocks 722 to 728. At block 722, a FE 402 has a lease with which it is allowed to access cache memory 410. At block 724, the FE 402 may determine whether it needs the lease. The determination may depend on, for example, whether any user (e.g., application) remains on the FE 402. If there is no user remaining, then the FE 402 may not need access to the cache memory 410. Accordingly, in cases where the FE 402 no longer needs a lease, the FE 402 may relinquish the lease by notifying the BE 420 at block 726. However, the BE 420 may issue a new lease to the FE 402 at block 728. This may be similar to the renewal scenario described with respect to FIG. 6. The BE 420 may provide the new lease based on, for example, a history of lease requests, frequency of lease requests, the capability requested in previous leases, the number of leases outstanding, etc., for the FE 402. This may allow, for example, the FE 402 to access the cache memory 410 quickly when the next application is started on the FE 402 or connects to the FE 402.

The FE may send its frontend status to the BE periodically or at certain events. For example, the status may be sent before and after a lease recovery process. This may allow the BE to, for example, scrub the leases that may be abandoned by FEs. The status sent by the FE may include, for example, the cache attributes.

When the FE notifies the BE that it is starting a recovery process, user actions may be blocked until the FE completes the recovery process. The recovery process may happen as a part of, for example, initialization of the FE.

The BE may track current usage of a file in order to grant the correct lease to each FE. The tracking may be done in RAM, and accordingly may not be persistent across failovers, where a failover may be when a node fails.

Various embodiments may have various usages defined. For example, shared read (SHREAD) may be when all FEs have only a read lease for a particular file. Exclusive write (XWRITE) may be when a single FE has a write lease on a file. Sync write (SYNWRITE) may be when a single FE has a write lease on a particular file and other FEs have only read leases. Shared write (SHWRITE) may be when more than one FE has a write lease on a file, while other FEs may have only a read lease on the file. These usages are shown below in Table 1.

TABLE 1

| ClusterUsagePattern | Reader read cache | Writer read cache |
|---|---|---|
| SHREAD | yes | n/a |
| XWRITE | n/a | yes |
| SYNWRITE | no | yes |
| SHWRITE | n/a | no |

Additionally, there may be various states associated with a FE. An inactive state may refer to a state when a bucket was just created and it is not up, yet. In other words, if a bucket is not up, then it is not ready for service. Since no RPCs (remote procedure calls) or messages can arrive until it is up, it may be meaningless to address the different messages for an inactive state.

A restoration state may allow all the lease holders to restore their leases. This may happen, for example, because the BE's tracking may not be persistent and may be lost on every failover. When a BE receives an acquire request during a restoration state, the BE may stall leases with a write capability. However, when a replay occurs, a replay may not be stalled. A replay may occur when, for example, a read-cache was valid when the read started but isn't valid when the read is finished. The data may need to be read again to prevent serving mixed pages (stale and clean) to the reading entity. A renew request may be granted with the requested lease, and caching may be allowed if applicable. The cache may be assured to be still clean as no other file user could have mutated, or changed, the data. Lease relinquishing requests where a lease hasn't been acquired may be allowed. This may happen, for example, where a FE could have made the request before knowing the BE is restoring leases. An unlink request may mark the file for future scrubbing.

In a renewal state, an acquire request may be granted for all leases, a renew request may be allowed for all leases, a relinquish request may be allowed for non-existing leases, and an unlink request may mark the file for future scrubbing.

In a normal state, the BE may accept requests for new leases, may renew the requested leases, fail relinquishing requests for non-existing leases, and an unlink request may allow the file to be fully removed if there are no open leases. If there are open leases, the file may be marked for future scrubbing.

Table 2 lists various state transitions.

TABLE 2

| States | Precondition | Action |
|---|---|---|
| Inactive → Restoration | Bucket steps up (initialization) | |
| Restoration → Renewal | Relevant Frontends know that the BE started restoring leases for at least K seconds | |
| Restoration → Normal Renewal → Normal | Relevant Frontends notified that they finished renewing all their leases | Start scrubbing unlinked files |
| Normal → Renewal | Frontend notifies that it's starting to renew (after a restart of the FE process) | |

Figure 8:
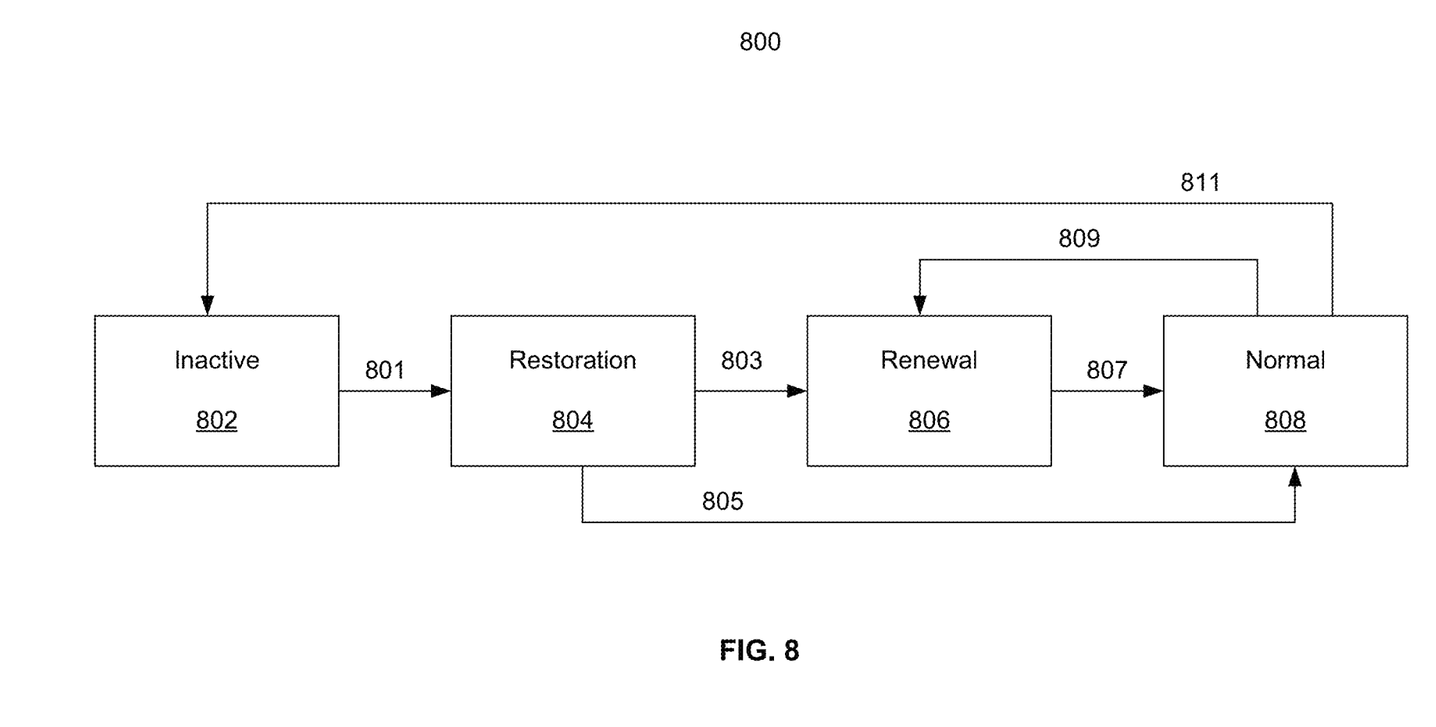
FIG. 8 is an example transition diagram illustrating state transitions in accordance with an example implementation of this disclosure.

FIG. 8 is an example transition diagram illustrating state transitions in accordance with an example implementation of this disclosure. Referring to FIG. 8, there is shown the state transition diagram 800 with states 802 to 808, and state transitions 801 to 811. When a bucket is first created, the bucket may be in the inactive state 802. While in the inactive state 802, upon stepping up, or after initialization, the bucket may be transition 801 to the restoration state 804.

While in the restoration state 804, when the relevant FEs for the bucket are notified of a BE restoring leases for a K number of seconds, the bucket may transition 803 to the renewal state 806. While in the restoration state 804, when the relevant FEs all have renewed their leases, then the transition 805 may take place to the normal state 808.

While in the renewal state 806, when the relevant FEs all have renewed their leases, then the transition 807 may take place to the normal state 808.

While in the normal state 808, if, for example, an FE crashes, then the transition 809 may take place for lease renewal for the FE that crashed. While in the normal state 808, if there is a BE failover, then there may be a transition 811 of the bucket to the inactive state 802. While in the normal state 808, unlinked files may be scrubbed.

While a specific transition diagram has been shown, various embodiments of the disclosure need not be so limited. Any of numerous other transition diagrams may be used based on different designs for the states and transition requirements.

Various embodiments of the disclosure may allow different numbers of open leases. For example, an embodiment may allow 128K opened leases per bucket. A frontend may also have different states that relate to leases. For example, during an initialization process, the frontend may notify the BE that it is starting the process of recovering leases, and may block user actions until the node completes the initialization process.

During a recovery state, the frontend may recover leases that belong to a single bucket. All leases that belong to a bucket may be saved in an atomic manner while allowing user operations to continue while leases are renewed. All the leases on the list may be renewed, where a failure to renew a lease may result in invalidation of the lease. If the bucket has a failover during the renewal process, then the renewal process may need to restart.

A lease for a file is given by the bucket that is responsible for that file. Since an extent may reside in any bucket, there may not be a need to manage their mutation in accordance to the current lease. Once an extent is read/queried after a lease has been revoked, no mutating operations under the revoked lease may get applied to the file. On any mutating operation, the lease holder may need to prove to the target bucket that it holds a valid lease to do so. For example, it may be desirable to avoid cases where once a lease is revoked, an RPC bearing that lease may be sent before the revocation and arrives at its destination after the revocation, and another frontend is assigned a new lease on that file. The danger is that two mutating operations to the same byte will be re-ordered, for example, the new lease holder operations will be overwritten by no-longer valid stale operations.

Each node may maintain a window for valid lease. Buckets on the node may only accept leases that are in the current allowed window for their originating bucket. Accordingly, abandoned writes may change the file contents after the lease has been revoked only if the extent wasn't read yet. Also, if, after a lease is revoked, which may have resulted in abandoned writes, the bucket responsible for the inode may query the last extent of the file, and the file size may be assured not to change.

Accordingly, as long as the lease is valid, the FE may be allowed to cache the file according to the lease capability. Therefore, the FE may be able to cache only if the lease is capable and valid. This may be verified with, for example, a lease validity check.

Keeping dirty page cache pages as part of our filesystem may result in destage time being long, and blocking other operations. If one of the servers gets an XWRITE (Exclusive Write) lease to one of the files and writes a lot of data, once another server tries to open the file for write, thus reducing the file to SHWRITE (Shared Write), or another server tries to open the file for read, thus reducing the file to SYN-WRITE (Sync Write), the destage process may take a long time and delay the open of that other server.

If the server with the XWRITE lease fails completely, the dirty data may be lost completely. If the server with the XWRITE lease and the dirty write cache freezes for a prolonged period, another server may take over the application and write to the files. There may then be a problem when the first server unfreezes and wants to write its dirty data. Taking a snapshot while there are hosts with files in XWRITE mode with dirty cache may result in indeterministic content of the snapshot. This may make testing much harder.

A solution may be when taking a snapshot, the system may downgrade all XWRITE files to SYNWRITE, thus forcing all dirty caches of the relevant files to be flushed. The snapshot may then be taken and the files promoted back to XWRITE. Another solution may be to have the system not allow a snapshot of a filesystem if there are files with dirty pages.

It may be noted that as long as there are no failures (no server freezes, no reboots, power failures, etc.) a write cache with the XWRITE mechanism may still result in a coherent access from other hosts. If another host opens the file for a read or a write, the lease mechanism may first destage all the dirty pages, and only then allow the other host to acquire the lease.

Different installation environments may have different performance characteristics, and also different criteria on how long a dirty cache destage may take. For example, a criterion may be how long a first open on another host will take when there is already one host with an XWRITE lease to that file and a dirty cache. Another criterion may be how much data a user is willing to lose in case of server failure. For example, environments with NVMe and 100 gb/e may allow for much more dirty memory than environment with slower SATA based SSDs and shared 10 gb/e links.

Various parameters may be used to facilitate control over the caches. For example, one parameter may be the dirty background ratio, which may be, for example, a percentage of memory that needs to be dirty for it to be flushed. A default may be, for example, flushing in the background if the dirty memory is greater than 10% of the total cache memory. Another parameter may be a dirty ratio, which may be, for example, a maximum percentage of memory that can be dirty before cache is flushed. If there is more dirty memory than this percentage, then the next write system call may be blocked until enough dirty pages have been destaged to reliable storage. A default value may be, for example, 40%. Another parameter may be, for example, an interval of time between the flush thread waking up to flush the cache. A default time may be, for example, 30 seconds. Of course, other values and percentages are possible and within the scope of the disclosure.

There may be, for example, two kinds of server failures—a freeze and terminal failure. With a terminal failure, the dirty data is lost forever. On the other hand, when a server freezes, another server may take over the files, even those that were in XWRITE, and write new data that may conflict with the dirty pages that the frozen server holds. A specific solution to a freeze may be design and/or implementation dependent. For example, once the new server has taken over the files, the dirty pages stored in the old server that froze may never be destaged, and the old server may need to go through a restart of some kind that may require human intervention.

Another form optimization may involve directory structures and metadata operations. These optimizations may be similar to those for data described above, but instead of taking a lease for the file in question, the lease may be taken for the parent directory for file addition/removal, and also for the "negative existence" so that when a file is cached that does not exist in that directory, if that directory is changed the information about the negative existence of that file may be deleted. If file attributes are changed, then the standard file lease may be revoked.

Accordingly, it can be seen that an implementation of the disclosure may be a distributed storage system that includes a frontend computing device comprising a local memory, where at least a portion of the local memory is used as a cache memory, a backend computing device, and a plurality of storage devices. The backend computing device may provide a lease to the frontend computing device such that the frontend computing device may be able to access at least one of the plurality of storage devices.

The cache memory may comprise a read cache and a write cache, and the lease may allow caching in one or both of the read cache and write cache, or disallow using either of the read cache and write cache. The local memory comprises random access memory such as, for example, one or both of SRAM and DRAM. The plurality of storage devices may comprise flash memory.

The lease may be for at least a portion of a file in the plurality of storage devices or for a directory in the plurality of storage devices. The backend computing device may provide the lease in response to the frontend computing device submitting a lease request to the backend computing device. The lease request may comprise a lease capability.

The frontend computing device may be configured to submit a lease renewal request to the backend computing device, and the lease renewal request may comprise a renewal lease capability. The backend computing device may be configured to provide a lease renewal when the renewal lease capability is the same as an initial lease capability of the lease.

The backend computing device may be configured to determine that the frontend computing device does not need the lease, and upon determining that the frontend computing device does not need the lease, the backend computing device may be configured to revoke the lease for the frontend computing device. The frontend computing device may also be configured to relinquish the lease upon determining that it does not need the lease.

Another implementation of the disclosure may be a method for using a distributed storage system that comprises requesting, by a frontend computing device to a backend computing device, a lease to access a plurality of storage devices using a local cache of the frontend computing device, and providing, by the backend computing device, a lease to access the plurality of storage devices. The lease may be one of: for at least a portion of a file in the plurality of storage devices, or for a directory in the plurality of storage devices.

The method may comprise the frontend computing device submitting a lease renewal request to the backend computing device, or relinquishing, by the frontend computing device, the lease upon determining that it does not need to access the plurality of storage devices. The method may also comprise the backend computing device revoking the lease upon determining that the frontend computing device does not need to access the plurality of storage devices.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What are claimed:

1. A storage system comprising:
a first computing device;
a second computing device; and
a plurality of storage devices, wherein:
the first computing device is a frontend computing device of a virtual file system (VFS), wherein the frontend computing device comprises a local memory, and wherein at least a portion of the local memory is used as a cache memory,
the second computing device is a backend computing device of the VFS, wherein the backend computing device is locally attached to at least one storage device of the plurality of storage devices,
the second computing device is operable to provide a token, associated with the at least one storage device, to the first computing device,
the second computing device is operable to manage the VFS as a leader of a cluster of nodes that share a common configuration,
the first computing device is operable to access the at least one of the plurality of storage devices according to the token,
the token is shared between the first computing device and the second computing device, and
the token is configured to signal an access by the first computing device.

2. The system of claim 1, wherein the first computing device comprises a read cache and a write cache.

3. The system of claim 2, wherein the token allows caching in one or both of the read cache and write cache.

4. The system of claim 1, wherein the token does not allow caching into a cache memory.

5. The system of claim 1, wherein the first computing device comprises random access memory (RAM).

6. The system of claim 5, wherein the first computing device comprises one or both of dynamic RAM (DRAM) and static RAM (SRAM).

7. The system of claim 1, wherein the plurality of storage devices comprises flash memory.

8. The system of claim 1, wherein the token allows access to at least a portion of a file.

9. The system of claim 1, wherein the token allows access to a directory.

10. The system of claim 1, wherein the second computing device provides the token in response to the first computing device submitting a lease request to the second computing device.

11. The system of claim 10, wherein the lease request comprises lease capability information.

12. The system of claim 1, wherein the first computing device is configured to submit a lease renewal request to the second computing device, and the lease renewal request comprises a lease renewal capability.

13. The system of claim 12, wherein the second computing device is configured to provide a lease renewal when the lease renewal capability is the same as an initial lease capability.

14. The system of claim 1, wherein the second computing device is configured to determine that the first computing device does not need the token, and upon determining that the first computing device does not need the token, the second computing device is configured to revoke a lease.

15. The system of claim 1, wherein the first computing device is configured to relinquish a lease upon determining that the first computing device does not need the token.

16. A method for using a storage system, comprising:
   requesting, by a first computing device to a second computing device, a lease to access a plurality of storage devices using a cache memory of the first computing device, wherein:
      the second computing device is operable to manage a virtual file system (VFS) as a leader of a cluster of nodes that share a common configuration,
      the first computing device is a frontend computing device of the VFS, wherein the frontend computing device comprises a local memory, and wherein at least a portion of the local memory is used as the cache memory, and
      the second computing device is a backend computing device of the VFS, wherein the backend computing device is locally attached to at least one storage device of the plurality of storage devices; and
   providing, by the second computing device, a token to access the plurality of storage devices, wherein:
      the token is shared between the first computing device and the second computing device, and
      the token is configured to signal an access, to the at least a portion of the plurality of storage devices, by the first computing device.

17. The method of claim 16, wherein the lease is one of: for at least a portion of a file in the plurality of storage devices, or for a directory in the plurality of storage devices.

18. The method of claim 16, comprising the first computing device submitting a lease renewal request to the second computing device.

19. The method of claim 16, comprising relinquishing, by the first computing device, the lease upon determining that the first computing device does not need to access the plurality of storage devices.

20. The method of claim 16, comprising revoking, by the second computing device, the lease upon determining that the first computing device does not need to access the plurality of storage devices.

\* \* \* \* \*